(12) United States Patent
Pijlman et al.

(10) Patent No.: US 9,383,075 B2
(45) Date of Patent: Jul. 5, 2016

(54) COLLIMATOR COMPRISING A PRISMATIC LAYER STACK, AND LIGHTING UNIT COMPRISING SUCH A COLLIMATOR

(75) Inventors: Fetze Pijlman, Eindhoven (NL); Michel Cornelis Josephus Marie Vissenberg, Roermond (NL); Siebe Tjerk De Zwart, Valkenswaard (NL); Jochen Renaat Van Gheluwe, Lommel (BE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 13/985,056

(22) PCT Filed: Feb. 21, 2012

(86) PCT No.: PCT/IB2012/050779
§ 371 (c)(1),
(2), (4) Date: Aug. 13, 2013

(87) PCT Pub. No.: WO2012/114267
PCT Pub. Date: Aug. 30, 2012

(65) Prior Publication Data
US 2013/0322090 A1 Dec. 5, 2013

(30) Foreign Application Priority Data

Feb. 22, 2011 (EP) .................................. 11155293

(51) Int. Cl.
*F21V 5/02* (2006.01)
*F21V 5/00* (2015.01)
(Continued)

(52) U.S. Cl.
CPC ................ *F21V 5/005* (2013.01); *G02B 5/045* (2013.01); *G02B 6/0053* (2013.01); *G02B 27/30* (2013.01)

(58) Field of Classification Search
CPC ...... G02B 5/045; G02B 27/30; G02B 6/0053; F21V 5/005
USPC ................... 362/97.4, 224, 244, 268, 311.01, 362/311.02, 311.12, 311.14, 326, 330, 331, 362/332, 335, 337, 339; 359/641
See application file for complete search history.

(56) References Cited

U.S. PATENT DOCUMENTS 4,542,449 A * 9/1985 Whitehead .................... 362/330
6,091,547 A 7/2000 Gardiner et al.
(Continued)

FOREIGN PATENT DOCUMENTS

EP 1486802 12/2004
EP 1586813 A1 10/2005
(Continued)

*Primary Examiner* — Y M Lee
(74) *Attorney, Agent, or Firm* — Meenakshy Chakravorty

(57) ABSTRACT

The invention provides a collimator comprising a first collimator face, a second collimator face, and a stack region. The stack region comprises a first layer having a first prismatically shaped top face with a plurality of 1D arranged first prisms having first prism axes, and a second layer having a second prismatically shaped top face with a plurality of 1D arranged second prisms having second prism axes. The first and second prism axes are in a crossed configuration. In a direction from the first collimator face to the second collimator face, the index of refraction of material upstream of the first prismatically shaped top face is larger than that of material downstream of the first prismatically shaped top face, and the index of refraction of material upstream of the second prismatically shaped top face is larger than that of material downstream of the second prismatically shaped top face.

13 Claims, 6 Drawing Sheets

(51) Int. Cl.
*G02B 5/04* (2006.01)
*F21V 8/00* (2006.01)
*G02B 27/30* (2006.01)

(56) References Cited

U.S. PATENT DOCUMENTS

| | | |
|---|---|---|
| 6,123,431 A | 9/2000 | Teragaki et al. |
| 7,631,980 B2 | 12/2009 | Holten |
| 7,683,533 B2 | 3/2010 | Kitayama et al. |
| 8,894,263 B2 * | 11/2014 | Yeom et al. .................. 362/268 |
| 2003/0035231 A1 | 2/2003 | Epstein et al. |
| 2004/0263039 A1 | 12/2004 | Takei et al. |
| 2005/0041311 A1 | 2/2005 | Mi et al. |
| 2007/0139776 A1 | 6/2007 | Meng et al. |
| 2009/0303730 A1 | 12/2009 | Holmberg |

FOREIGN PATENT DOCUMENTS

| | | |
|---|---|---|
| JP | 59171404 A | 9/1984 |
| JP | H09281310 A | 10/1997 |
| JP | 2006091821 A | 4/2006 |
| JP | 2009216943 A | 9/2009 |
| WO | 2008146229 A2 | 12/2008 |
| WO | 2009124107 A1 | 10/2009 |
| WO | 2010091888 A1 | 8/2010 |

* cited by examiner

COLLIMATOR COMPRISING A PRISMATIC LAYER STACK, AND LIGHTING UNIT COMPRISING SUCH A COLLIMATOR

FIELD OF THE INVENTION

The invention relates to a collimator comprising a prismatic layer and to a lighting unit comprising a light source and such a collimator.

BACKGROUND OF THE INVENTION

Lighting units or luminaires with optically active layers are known in the art. U.S. Pat. No. 7,631,980, for instance, targets at a luminaire comprising a light source and a lighting panel in front of the light source, wherein the outer side (front side) of the lighting panel has a profiled surface in order to direct the transmitted light radiation mainly into a predetermined zone, wherein the light radiation is at relatively small angles to the direction perpendicular to the plane of the lighting panel, and wherein light radiation at small angles to the plane of the lighting panel is reduced, in particular, when the luminaire has to produce light radiation of a relatively high intensity in the predetermined zone. To achieve this target, walls of a less translucent material are embedded in the transparent material of the lighting panel, which walls extend substantially perpendicularly to the plane of the lighting panel and preferably extend across the entire thickness of the lighting panel, i.e. across the thickness of the transparent material of the lighting panel. According to U.S. Pat. No. 7,631,980, such walls were found to be an effective means for further reducing inconvenient light radiation from the lighting panel.

Further, according to U.S. Pat. No. 7,631,980, it was found that light radiation that leaves the profiled surface at the front of the lighting panel at a relatively small angle to the plane of the lighting panel causes inconvenient glare and has followed long paths through the material of the lighting panel. Such long paths are possible for certain light rays in the transparent material of the lighting panel, in particular light rays directed at small angles to the plane of the lighting panel. According to U.S. Pat. No. 7,631,980, such light rays appear to be an undesired side effect of the structure of the profiled surface. Such undesired light rays may also be caused by reflection or scattering of light radiation by dust and other particles on the surface of the lighting panel, or by damage to or irregularities in the material of the lighting panel.

SUMMARY OF THE INVENTION

Luminaires in various applications often need to meet a number of requirements. One of the important requirements is connected with how much light comes out of the luminaire at large angles with respect to the normal when the luminaire is mounted to the ceiling. This light is also called glare and a metric called UGR (Unified Glare Rating) is used for quantifying the amount of glare.

There are some optical methods of reducing glare, and one of them makes use of a micro lens optical plate. Micro lens optical plates, for instance produced by Jungbecker, basically allow passage of light without this leading to glare at large angles, but they also reflect light back into the light source. If this reflected light is efficiently recycled, then it may have a second or third chance of passing the MLO (micro lens optics) plate. This effect is very similar to BEF foils in LCD backlights. BEF stands for Brightness Enhancement Foils, which denomination is used by 3M to refer to prismatic foils having an apex angle of 90°.

A disadvantage of collimating the light downwards is that vertical surfaces in a room, like faces, are less well illuminated. The optimal beam of a luminaire nicely balances vertical illumination with not too much light emission at large angles. The term "large angles" basically refers to angles beyond 65° with respect to the normal.

MLO plates could thus be used, but they may be relatively thick and may also be relatively expensive to produce, as they may require a three dimensional structure to be formed on a large surface.

Hence, it is an aspect of the invention to provide an alternative collimator and an alternative light source using such a collimator, which preferably further at least partly obviate one or more of the above-described drawbacks.

The invention proposes a system, such as a foil, consisting of (at least) two layers. The lowest layer may, in an embodiment, have a flat surface and has a prismatically shaped top interface. The second layer has a prismatically shaped face, but in a direction perpendicular to the orientation of the prisms in the first layer. Hence, the invention proposes optical layers consisting of (linear) prismatic structures. By arranging two layers of this material in a crossed orientation, the intensity distribution obtained may be equal to that of the existing MLO plates. Said layers may be similar to BEF-layers (Brightness-Enhancement-Films). The pitch of the prisms may vary from 10 microns to several millimeters. An advantage of this system may be that it requires only a simple production process. For instance, embossing may be applied. Further, a thin and/or flexible collimator may be obtained.

Therefore, in a first aspect, the invention provides a collimator (or collimator foil or collimator plate) comprising a first collimator face and an opposite second collimator face, and a stack region (herein also referred to as stack), wherein the stack region comprises (a) a first layer (herein also referred to as "first prismatic layer") having a first prismatically shaped top face with a plurality of 1D (one-dimensionally) arranged first prisms, having (parallel arranged) first prism axes, and (b) a second layer (herein also referred to as "second prismatic layer") having a second prismatically shaped top face with a plurality of 1D arranged second prisms having (parallel arranged) second prism axes, wherein the first prism axes and the second prism axes are in a crossed configuration, wherein in a direction from the first collimator face to the second collimator face, the index of refraction of material upstream of the first prismatically shaped top face is larger than that of material downstream of the first prismatically shaped top face (i.e. the material closer to a (fictive) light source, here at the upstream side of the first prismatically shaped top face, has a larger index of refraction than material further away from the (fictive) light source, here at the downstream side of the first prismatically shaped top face), and wherein the index of refraction of material upstream of the second prismatically shaped top face is larger than that of material downstream of the second prismatically shaped top face (i.e. the material closer to the (fictive) light source, here at the upstream side of the second prismatically shaped top face, has a larger index of refraction than material further away from the (fictive) light source, here at the downstream side of the second prismatically shaped top face).

With such a collimator, light originating from a light source may efficiently and effectively be collimated and glare may be reduced. Further, the collimator may be thin and may optionally be flexible. The collimator may have a better appearance, since the features (i.e. the prisms) may not be visible. Assuming that the system used is a foil-based system, the thickness of the collimator may for instance be in the order of 50-200 µm. Instead of foils (flexibility), of course also plates (or sheets) may be used. Then, the thickness of the collimator may for instance be in the order of 2-4 mm.

The length and width of the collimator will be much larger than the height, as the collimator may be a foil or a plate. Hence, the faces (front/back) are herein indicated as opposite (first and second) faces.

Herein, the term "stack" or "stack region" indicates that the layers (herein also indicated as prismatic layers) are arranged above one another (are stacked), with optionally one or more intermediate layers in between and/or upstream or downstream of the first and second layers. When using such a collimator, a light source will illuminate the first prismatic layer (from the back side, i.e. in the direction in which also the first prisms point), or an optional layer upstream of the first prismatic layer, and at least part of the light will be transmitted through the first prismatic layer and illuminate, optionally after transmission through one or more optional intermediate layers, the second layer, and subsequently at least part of the light transmitted through the first prismatic layer is transmitted through the second layer, and optionally one or more further (downstream) layers from which at least part may escape as collimated (lighting unit) light. The term "region" is used to indicate that there may be a plurality of adjacently arranged stacks, with each stack forming a stack region. Hence, in the plane of the collimator, different stack regions may be present.

As will be clear to a person skilled in the art, the (prismatic) layers are transmissive. Likewise, the optional further layers, such as the one or more intermediate layers or a bottom layer or a top layer (see also below) are also transmissive. Hence, more precisely, the whole stack region may be transmissive. Transmissive materials that may be used may for instance be selected from the group consisting of PE (polyethylene), PP (polypropylene), PEN (polyethylene napthalate), PC (polycarbonate), polymethylacrylate (PMA), polymethylmethacrylate (PMMA) (Plexiglas or Perspex), cellulose acetate butyrate (CAB), polycarbonate, polyvinylchloride (PVC), polyethyleneterephthalate (PET), (PETG) (glycol modified polyethyleneterephthalate), PDMS (polydimethylsiloxane), and COC (cyclo olefin copolymer). As mentioned above, the layers may, in an embodiment, be similar to BEF-layers (Brightness-Enhancement-Films). Hence, the collimator stack is a transmissive collimator stack.

The first prismatic layer and the second prismatic layer are in a crossed configuration, i.e. the 1D (one dimensional) directions of the prisms of the first prismatic layer and of the second prismatic layer include an angle with each other (substantially other than 0° or 180°). In other words, the first prism axes and the second prism axes have mutual angles ($\theta$) unequal to 0 or 180°, especially in the range of 80-100°. The best collimating results may be obtained when the mutual angles $\theta$ are in the range of 80-100°, particularly 85-95°, even more particularly when they are at right angles to each other. Alternatively, "crossed" can be defined to mean that the length direction of the grooves of the prismatic sheets mutually extend at an angle $\theta$ with each other (whose values are as defined above).

Viewed in cross section, the prisms have a triangular shape with a prism apex angle, and grooves in between with groove angles. The grooves can be seen as virtual prisms.

The prisms may, in an embodiment, be elongated and arranged parallel to one another. In such embodiments, the 1D prisms and their prism axes are longitudinal. In this embodiment, the stack regions may have, in the plane (which is parallel to the first and the second collimator face) of the collimator, a square, rectangular or, if desired, other cross-section. However, the prisms may, in another embodiment, also be arranged concentrically or radially, see further below. In this embodiment, the stack regions may in general have, in the plane of the collimator, a circular cross-section. When the prisms are radially arranged, the prism axes are not parallel; when they are concentrically arranged, the prism axes are parallel. In general, the prism axes of the first layer of the stack region are parallel (within that layer) and the prism axes of the second layer of the stack region are parallel (within that layer), or one of the first and the second layer comprises concentrically arranged 1D prisms and the other layer comprises radially arranged 1D prisms. Hence, herein, the prismatic layers are indicated as 1D arranged prismatic layers.

The dimensions and angles of the prisms, prism apexes, grooves and groove angles may be different for both prismatic layers. In principle, however, even within one single prismatic layer there may be a variation of the prism apex angles, groove angles and/or dimensions. Preferably, however, the angles and dimensions within one prismatic layer are the same throughout the prismatic layer.

Hence, the stack region comprises a first prismatic layer comprising 1D arranged first prisms, said prisms having first prism apexes having first prism apex angles, and first grooves, having first groove angles; and (downstream thereof) a second prismatic layer comprising 1D arranged second prisms, with second prism apexes having second prism apex angles, and second grooves, having second groove angles.

The first prisms and second prisms may have prism apex angles ($\alpha$) and groove angles ($\beta$) selected in the range of 70-150°, especially 80-100°. The prism apex angles may be selected independently for the first and for the second prisms. Likewise, the groove angles may be independently selected for the first and for the second prisms. In a specific embodiment, the first and second prism apex angles are substantially identical in value. In a further specific embodiment, the first and second groove angles are substantially identical in value. Particularly, the prism apex angles and groove angles are 90°.

Within one prismatic layer, there may be two or more subsets of prisms and/or grooves, which comply with the above condition, but which differ in the value of for instance the prism angles and/or groove angles. For instance, there may be a statistical distribution of the angles (within the indicated range(s)).

Due to the nature of the prismatic layer, in an embodiment, the prism apex angles and groove angles within one prismatic layer may be substantially identical (unless there is a variation over the layer, as indicated above in a specific embodiment), for instance both the prism apex angle(s) and groove angel(s) are 9020 for the first or the second prismatic layer.

In an embodiment, the first layer and the second layer have a prismatic layer pitch selected in the range of 5-5000 µm, such as 5-2000 µm, particularly in the range of 5-200 µm. Again, the pitch of the first layer may be chosen independently of the pitch of the second layer, and vice versa. Within one prismatic layer, there may be two or more subsets of prisms and/or grooves, which differ in the value of for instance the pitch.

In an embodiment, the first prismatic layer and/or the second prismatic layer are obtainable by extrusion or embossing.

The general conditions defined above may be fulfilled by a number of embodiments with or without intermediate layers and/or with or without other layers, upstream or downstream of the stack.

For instance, in a first variant, a foil consisting of two layers may be provided. The lowest layer may have a flat surface and has a prismatically shaped top interface. A typical refractive index is 1.6 and the apex angle of the prism is 90°. The second layer may have a refractive index of 1.4 and is also prismatically shaped but in a direction perpendicular to the orientation of the prisms in the first layer. The material over the stack region (i.e. here over the second layer) may basically be air (index of refraction is 1). An advantage of such a system may be that it can be manufactured using a simple production process. The first layer can be produced via embossing after which the lower side is filled with a high refractive index material, and then structured for instance by embossing. Hence, in an embodiment, the invention provides an embodiment of the collimator, wherein the first layer and the second layer are adjacently arranged, wherein the first prismatically shaped top face is the interface between the first layer and the second layer, and wherein the index of refraction of the first layer is larger than that of the second layer. The second prismatically shaped top face may be exposed to air (or optionally another material, see the embodiments below). Hence, the second prismatically shaped top face may be the interface between the second layer and the surroundings. Therefore, in such an embodiment the index of refraction of the second layer is larger than that of the material (i.e. especially air) downstream thereof.

In a second variant, an intermediate layer is applied. For instance, the first layer may be as indicated above, and the third layer may be as indicated above, but arranged upside down (i.e. prisms pointing towards the first layer), with an intermediate layer therebetween. By way of example, the refractive indices (n1, n2, n3, respectively) of the materials of the first layer, the intermediate layer and the second layer may be n1>n2>n3, respectively, with n3 for instance being about 1.4. The n3 material, i.e. the second layer, may have a flat top interface. It is an advantage that the product can be damaged less easily (scratches). Prisms are known to be sensitive to scratches. In addition, a top flat interface allows protective coatings to be provided. Hence, the invention further provides an embodiment of the collimator, wherein the stack region comprises the first layer, an intermediate layer, and the second layer, wherein the first layer, the intermediate layer, and the second layer are adjacently arranged, wherein the first prismatically shaped top face is the interface between the first layer and the intermediate layer, and wherein the second prismatically shaped top face is the interface between the intermediate layer and the second layer, wherein the index of refraction of the first layer is larger than that of the intermediate layer, and wherein the index of refraction of the intermediate layer is larger than that of the second layer. This embodiment can also be seen as identical to the embodiment described in the previous paragraph, yet with a flat top layer (i.e. stack of first layer, second layer and top layer (with flat top)).

In a third variant, which is similar to the previous one, four layers are used instead of three. Particularly, the stack region comprises the first layer, an intermediate layer, the second layer, and a top layer, wherein the first layer, the intermediate layer, the second layer and the top layer are adjacently arranged, wherein the first prismatically shaped top face is the interface between the first layer and the intermediate layer, and wherein the second prismatically shaped top face is the interface between the second layer and the top layer, wherein the index of refraction of the first layer is larger than of the intermediate layer, and wherein the index of refraction of the second layer is larger than of the top layer. The interface between the intermediate layer and the second layer is preferably flat in this embodiment. For instance, the first layer and the second layer may have indices of refraction of for instance 1.6, and the intermediate layer and the top layer may have indices of refraction of for instance 1.4. An advantage of this embodiment may be that the system may be composed of cheap display foils. This embodiment can also be seen as the same embodiment as described in the first variant, yet with a flat top layer, and with two intermediate layers (i.e. stack of first layer, intermediate layer, intermediate layer, and second layer (with flat top)).

In a fourth variant, which is substantially similar to the third variant, the first layer may be coated (from below) with a material having a low refractive index of, for instance, 1.4. The advantage may be a higher transmission of the system. In this way, a 5-layer stack may be provided. Hence, the invention also provides a variant of the collimator, wherein the stack region comprises a bottom layer, a first layer, an intermediate layer, a second layer, and a top layer, wherein the bottom layer, the first layer, the intermediate layer, the second layer and the top layer are adjacently arranged, wherein the first prismatically shaped top face is the interface between the first layer and the intermediate layer, and wherein the second prismatically shaped top face is the interface between the second layer and the top layer, wherein the index of refraction of the first layer is larger than that of the intermediate layer, and wherein the index of refraction of the second layer is larger than that of the top layer.

In principle, the coating of a bottom layer or of a layer upstream thereof may also be relevant for variants 1 and 2.

The phrase "adjacently arranged layers" and similar phrases particularly indicate that the layers within the stack are in physical contact with each other.

The collimator, or more specifically the stack, may (thus) further comprise additional (optional) optical elements, for example in the form of (transmissive) layers. For instance, in an embodiment, the stack further comprises an optical layer arranged downstream of the second prismatic layer, such as the above indicated top layer. Such an optical layer may for instance be used as exit window and/or as protective layer. When the apexes of the second prisms are truncated, such an optical layer downstream of the second prismatic layer may be in physical contact with the truncated prisms (i.e. with the flat truncated apexes). Alternatively or additionally, the stack further comprises a diffuser layer arranged upstream of the first prismatic layer, such as the above indicated bottom layer. For instance, this optical layer may be used to diffuse the light of an (upstream) light source.

Crossed prisms may reduce light at large angles (collimation effect). This may particularly be the case for the directions along one of the prism directions. However, along a diagonal, the light at large angles may be suppressed less. For addressing this problem, further variants are proposed, such as concentrically arranged prisms or a locally different configuration of the stack regions.

The 1D prisms may be elongated in a straight line or may be curved (see also above). For instance, concentric circles of 1D prisms may also be applied. A condition to be met, however, is that the prisms in the other layer are arranged in such a way that the prism axes are (locally) in a crossed configuration. Hence, in an embodiment, the first prism axes as well as the second prism axes are parallel arranged axes, respectively, but in another embodiment, the first prism axes and the second prism axes are radially and concentrically arranged, respectively. In the former embodiment, the 1D prisms of the first prismatically shaped top face are arranged parallel and the 1D prisms of the second prismatically shaped top face are arranged parallel; the prism axes of the respective faces are however in a crossed configuration with respect to each other. Also in the latter embodiment, (locally) crosses (i.e. crossed configurations), such as perpendicular arrangements of the respective prism axes may be obtained.

The collimator may comprise a single stack region, but may alternatively comprise, in an embodiment, a plurality of stack regions. It may be advantageous to have two or more different orientations of the axes when there are two or more stack regions. In this way, light may further be homogenized and may have a better distribution. Hence, in an embodiment, the collimator comprises a plurality of adjacently arranged prismatic layer stack regions. The period of the repetition may be in the range of for instance 0.5 mm-5 cm, such as 1 mm-2 cm. Thus, the 1D directions may differ from stack to stack. This may allow a further improvement of the smoothness of the light distribution of the collimated light.

The phrase "adjacently arranged stack" and similar phrases may indicate here that the stack regions within the collimator are in physical contact with each other, but this is not necessarily the case. For instance, when the stack regions are circular regions, the circular regions may contact one or more neighboring regions, but this is not necessarily the case.

Preferably the foil is kept as thin as possible to reduce or prevent leakage in between the foils from one segment to another.

In a further aspect, the invention provides a lighting unit comprising a light source, configured to provide light source light, and the collimator as described herein, configured to collimate the light source light. The collimator will be arranged downstream of the light source, and the sequence will be (i) light source, downstream thereof (ii) the first prismatic layer and downstream thereof (iii) the second prismatic layer (not excluding other layers upstream, downstream or intermediate).

In a specific embodiment, the lighting unit may further comprise a light box, wherein the light box encloses the light source and wherein the light box comprises a light transmissive window, wherein the light transmissive window comprises the collimator.

Particularly, the light box may enclose a plurality of light sources. The light box may be used to homogenize light and/or homogenize light distribution. The light source can be any light source. However, especially solid state light sources (solid state LEDs) may be of interest, because of their dimensions. Further, the term "light source" may also refer to a plurality of light sources. The collimator may also be used at an outcoupling surface of a waveguide.

The light collimator may be configured, in particular, to suppress radiation escaping from the collimator at an angle larger than 65° (i.e. the glare angle). The collimator may thus be used to reduce glare. In an embodiment, the collimator is configured to collimate the light of the lighting unit in such a way that when the lighting unit emits light at angles (with respect to the normal to the stack) ≥65°, the luminance is <1500 cd/m². Of course this (glare) angle may be chosen to have a different value, dependent upon the application of the lighting unit. With the collimator of the invention, this may be achieved in a relatively easy way with optionally a flexible, thin collimator.

Hence, the present invention enables a thin lighting unit to be provided with low or negligible glare. The lighting unit may be applied in for instance an office, a shop, a hospitality area (such as a hotel, a restaurant, a hospital, etc.), etc. For instance, the lighting unit may be applied as embedded unobtrusive light sources (for instance lighting integrated into a ceiling grid).

Herein, the terms "upstream" and "downstream" relate to an arrangement of items or features relative to the propagation of light from a light generating means (here, in particular, the light source), wherein relative to a first position within a beam of light from the light generating means, a second position in the beam of light closer to the light generating means is "upstream", and a third position within the beam of light further away from the light generating means is "downstream".

The term "substantially" herein, such as in "substantially all emission" or in "substantially consists", will be understood by the person skilled in the art. The term "substantially" may also include embodiments with "entirely", "completely", "all", etc. Hence, in embodiments the adverb substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in sequences other than described or illustrated herein.

The devices used herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings.

BRIEF DESCRIPTION OF THE DRAWINGS

Embodiments of the invention will now be described, by way of example only, with reference to the accompanying schematic drawings in which corresponding reference symbols indicate corresponding parts, and in which.

Figure 1A:
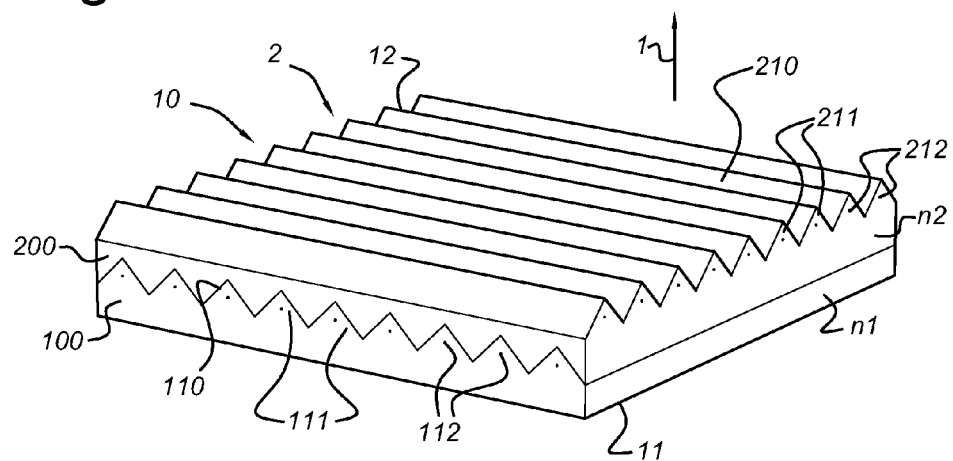
FIGS. 1a-1d schematically depict some embodiments of the invention.

The drawings are not necessarily on scale.

DETAILED DESCRIPTION OF THE EMBODIMENTS

FIGS. 1a-1d schematically depict some possible variants of the collimator, referenced 10, of the invention.

These figures show the collimator 10, which comprises a first collimator face 11 and an opposite second collimator face 12. The collimator further comprises a stack region 2.

Most of the figures depict embodiments in which the collimator 10 consists of one (1a-1d, 1f, 2c) or more (2d, 2f) stack regions.

Stack region 2 comprises a first layer 100 having a first prismatically shaped top face 110 with a plurality of 1D arranged first prisms 111 having parallel arranged first prism axes 112.

The first collimator face 11 can also be considered the upstream face of the collimator. It is the face which may be illuminated by a light source, see below.

Downstream of the first layer 100, the stack region 2 comprises a second layer 200 having a second prismatically shaped top face 210 with a plurality of 1D arranged second prisms 211 having parallel arranged second prism axes 212. These layers may be identical, but the prism axes 112,212 are arranged in such a way that they have a mutual angle unequal to 0° or 180°; preferably the prism axes are perpendicular to one another.

In a direction 1 from the first collimator face 11 to the second collimator face 12 (i.e. from upstream to downstream), the index of refraction of material upstream of the first prismatically shaped top face 110 is larger than that of material downstream of the first prismatically shaped top face 110. Further, the index of refraction of material upstream of the second prismatically shaped top face 210 is larger than that of material downstream of the second prismatically shaped top face 210. Here, downstream of the second prismatically shaped top face 210 is air.

Note that in FIG. 1a the second prismatically shaped top face 210 is the second collimator face 12.

FIG. 1a schematically shows an embodiment of the collimator 10, wherein the first layer 100 and the second layer 200 are adjacently arranged, wherein the first prismatically shaped top face 110 is the interface between the first layer 100 and the second layer 200. As indicated above, the index of refraction of the (material of the) first layer 100 is larger than that of the second layer 200; the former is indicated by means of n1; the latter is indicated by means of n2. The index of refraction of the second layer 200 in turn is larger than that of the air above the second layer 200.

Figure 1B:
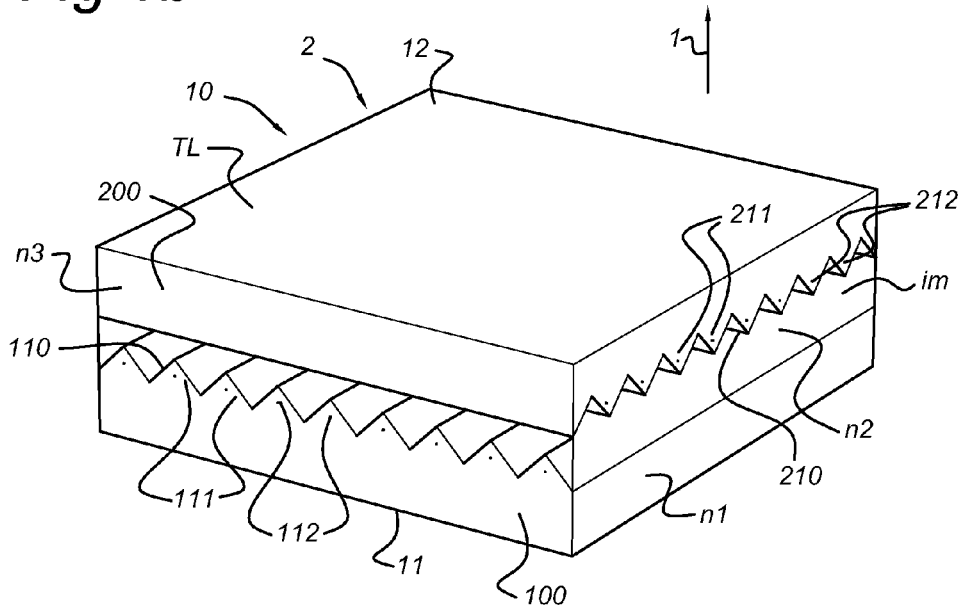
Figure 1C:
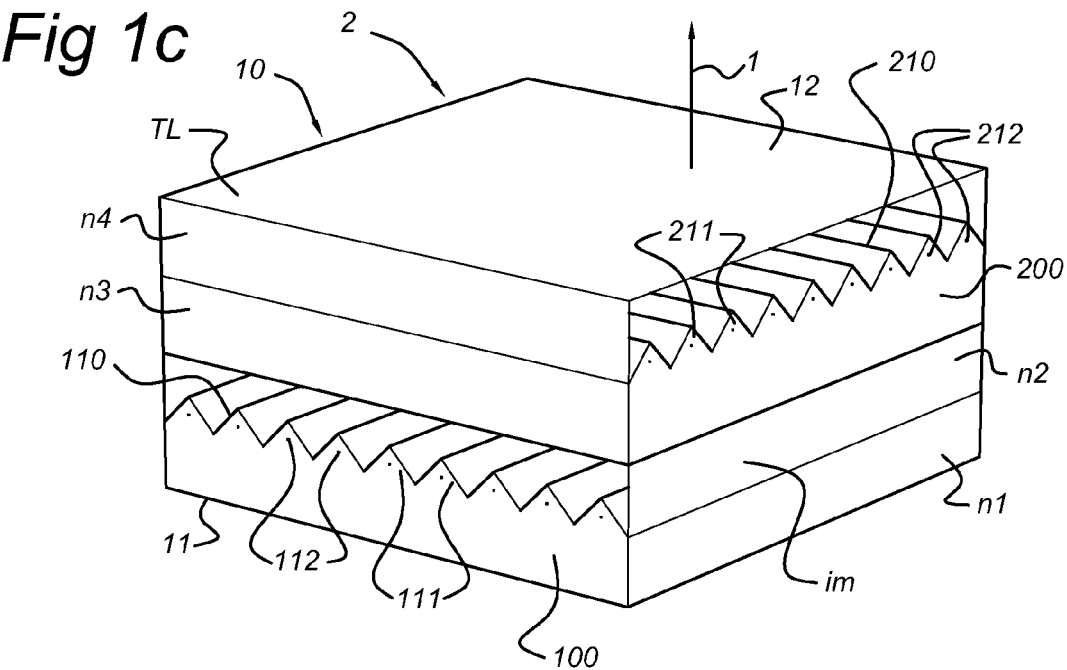
Figure 1D:
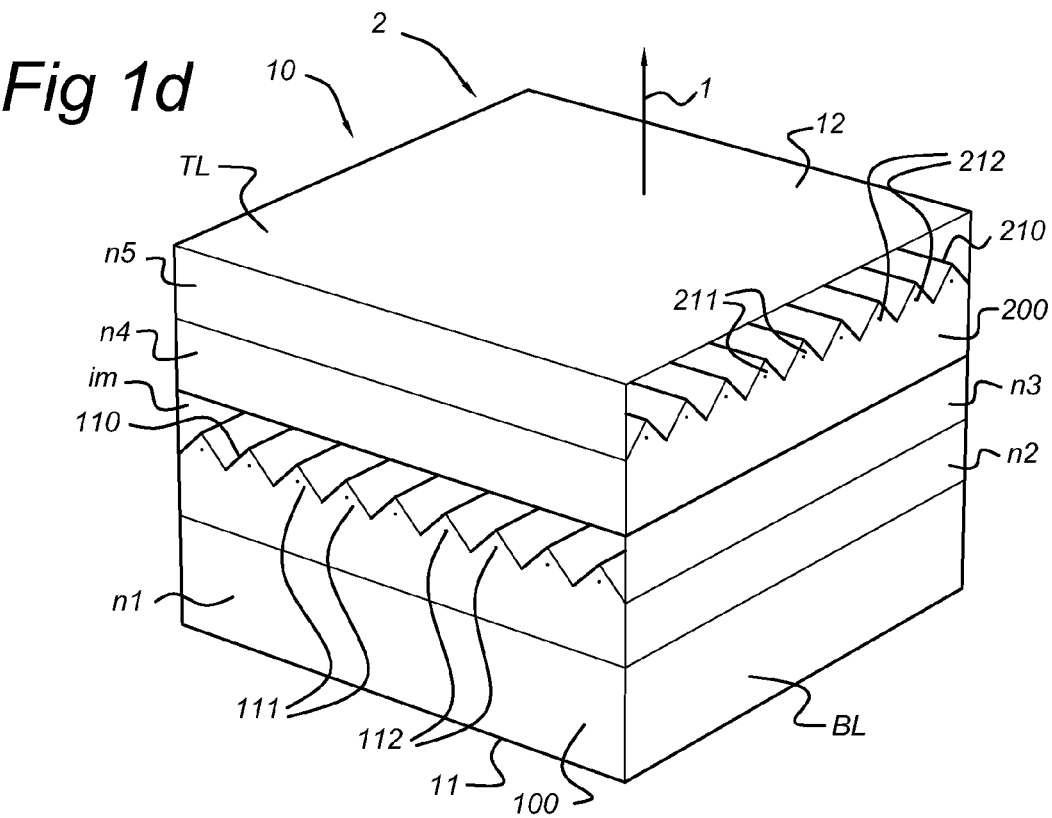

FIGS. 1b-1d show some other variants. FIG. 1b schematically shows a variant of the collimator 10, wherein the stack region 2 comprises the first layer 100, an intermediate layer, and the second layer 200, wherein the first layer 100, the intermediate layer, indicated by means of reference IM, and the second layer are adjacently arranged. In this embodiment, the first prismatically shaped top face 110 is the interface between the first layer 100 and the intermediate layer IM. The second prismatically shaped top face 210 is the interface between the intermediate layer IM and the second layer 200. The index of refraction n1 of the first layer 100 is larger than (n2) of the intermediate layer IM. The index of refraction (n2) of the intermediate layer IM is larger than (n3) of the second layer 200.

Note that the intermediate layer IM may be equally well interpreted as second layer, and the layer indicated in this figure as second layer 200 may then be indicated as top layer. Of course, even when changing the semantics, the index of refraction upstream of the prismatically shaped top face is larger than downstream of said prismatically shaped top face. This applies to both the change from upstream to downstream of the first prismatically shaped top face and to the change from upstream to downstream of the second prismatically shaped top face (i.e. in the direction of arrow 1).

FIG. 1c schematically shows an embodiment of the collimator 10, wherein the stack region 2 comprises the first layer 100, an intermediate layer IM, the second layer 200, and a top layer TL. The first layer 100, the intermediate layer IM, the second layer 200 and the top layer TL are adjacently arranged. The first prismatically shaped top face 110 here is the interface between the first layer 100 and the intermediate layer IM. Further, the second prismatically shaped top face 210 here is the interface between the second layer 200 and the top layer TL. The index of refraction n1 of the first layer 100 is larger than (n2) of the intermediate layer IM, and the index of refraction n3 of the second layer 200 is larger than (n4) of the top layer TL. The top layer may be a protective layer and/or may have (further) collimating properties.

FIG. 1d schematically depicts an embodiment of the collimator 10, wherein the stack region 2 comprises a bottom layer BL, the first layer 100, an intermediate layer IM, the second layer 200, and a top layer TL. The bottom layer BL, the first layer 100, the intermediate layer IM, the second layer 200 and the top layer TL are adjacently arranged. Further, the first prismatically shaped top face 110 is the interface between the first layer 100 and the intermediate layer IM, and the second prismatically shaped top face 210 is the interface between the second layer 200 and the top layer TL. The index of refraction n2 of the first layer 100 is larger than (n3) of the intermediate layer IM, and the index of refraction n4 of the second layer 200 is larger than (n5) of the top layer TL.

Here, the stack region 2 further comprises bottom layer BL arranged upstream of the first prismatic layer 100. This layer may for instance be used as diffuser layer, and may equally well be applied in the other embodiments.

Note that herein n1-n5 are simply numbers corresponding to the sequence of the stack layers and are not always necessarily associated with a specific layer. For instance, n1 is the index of refraction of the material of the first layer 100 in FIGS. 1a-1c, whereas in FIG. 1d, n1 is the index of refraction of the material of the bottom layer BL.

Further, note that all stack layers are layers within the boundaries of the first collimator face 11 and the second collimator face 12. These faces will in general be arranged parallel to each other. Likewise, the major faces of the prismatic layers, i.e. the smooth side and the grooved side, extend mutually parallel. In general, all major faces of all layers extend mutually parallel.

Light from a light source (not indicated; see below) will travel in a direction from the first collimator face 11 to the second collimator face 12, and will escape therefrom. Thus, relative to the light source, the second prismatic layer 200 is downstream of the first prismatic layer 100; the first prismatic layer 100 is upstream of the second prismatic layer 200.

Figure 1E:
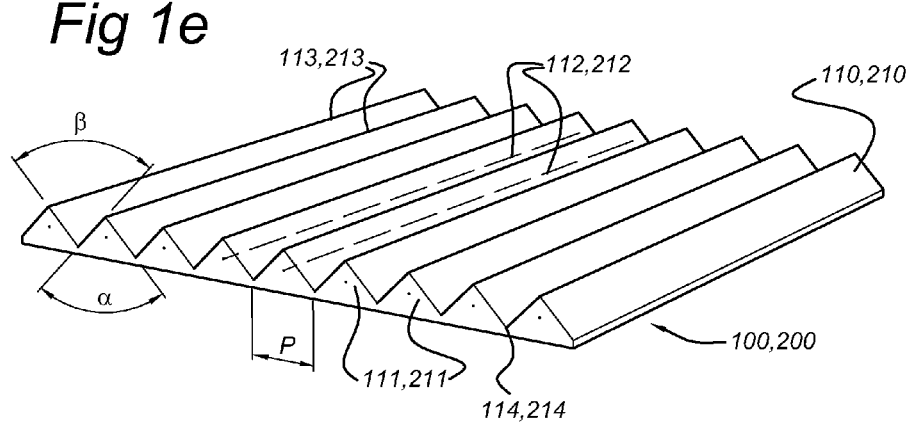
FIGS. 1e-1f schematically depict some principles of the invention.

FIG. 1e is depicted to show in more detail the first or the second layer. Hence, some references refer to both aspects of the first layer and the second layer. This figure may describe the first layer as well as the second layer. This does however not imply that the first layer 100 and the second layer 200 have identical properties. The materials may be different, the apex angles α may be different, the groove angles β may be different. Also the pitches, indicated by reference p, may be different.

Figure 1F:
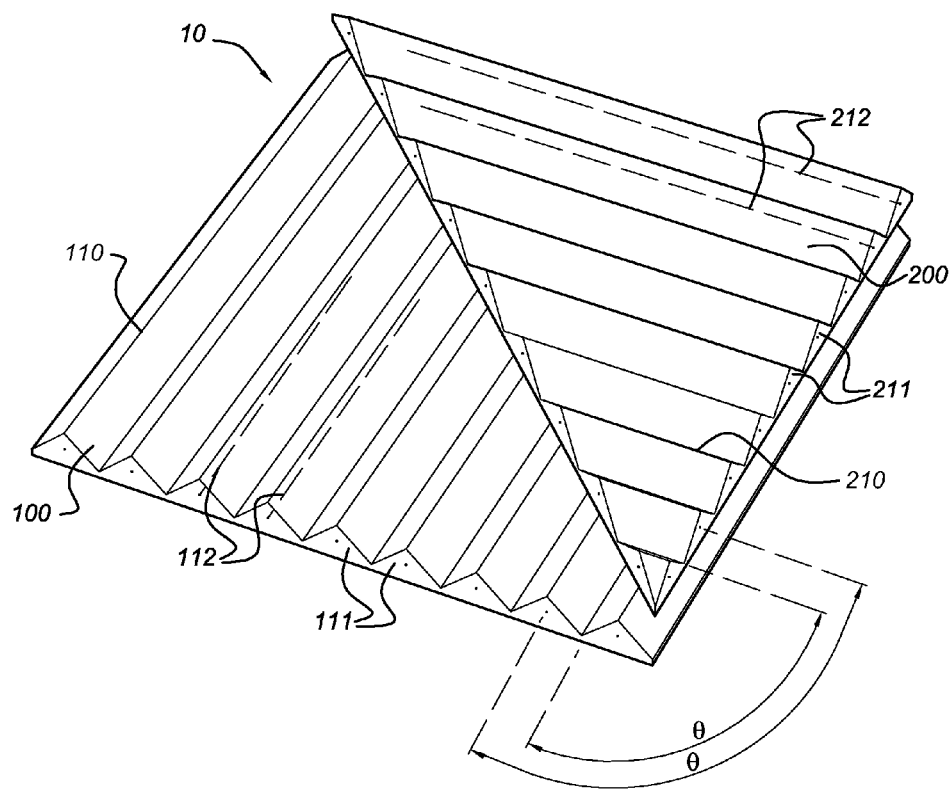

FIG. 1f schematically shows a top view of an embodiment of the collimator 10. The first prisms 111 have first prism axes 112 and the second prisms 211, of the second layer 200, have second prism axes 212. Here the prism axes are longitudinal axes. The first prism axes 112 and the second prism axes 212 each have mutual angles θ, especially in the range of 80°-100°. This of course also implies that they have mutual angles of 180°-80° and 180°-100°. Anyhow, preferably, no mutual angle is larger than 100° (or smaller than 80°). Hence, the prism axes 112,212 herein indicated are arranged in a crossed configuration.

Figure 2A:
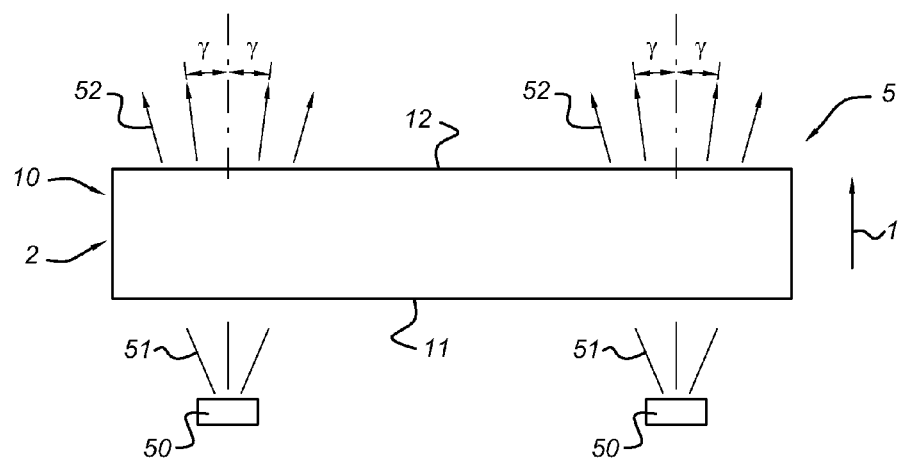
FIGS. 2a-2f schematically depict some embodiments of the lighting unit and some further embodiments and variants.

FIG. 2a schematically depicts an embodiment of a lighting unit 5 comprising a light source 50, for instance a LED, configured to provide light source light 51 and an embodiment of the collimator 10 as defined herein, wherein the collimator 10 is configured to collimate the light source light 51. Hence, the collimator 10 is arranged downstream of the light source 50. Further, the first collimator face 11 is downstream of the light source 50, but upstream of the second collimator face 12. The second collimator face 12 is downstream of the first collimator face 11.

Figure 2B:
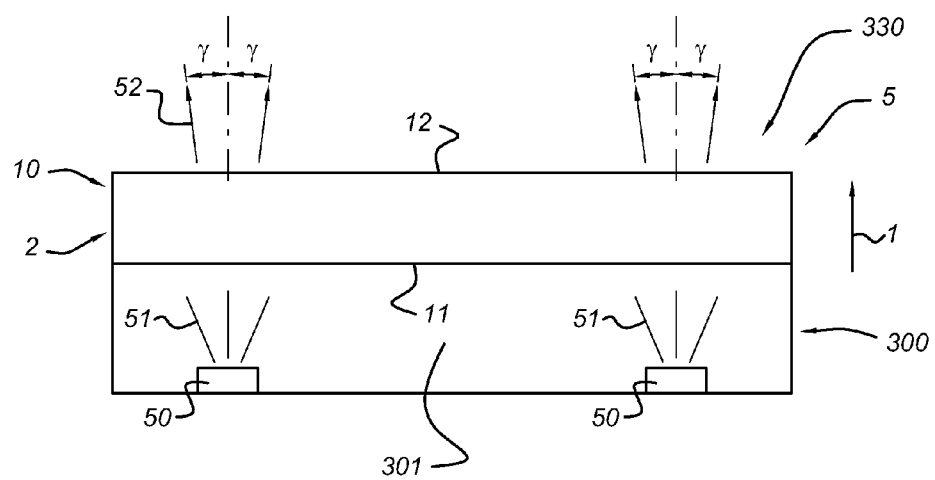

In particular, FIG. 2b schematically depicts an embodiment of the lighting unit 5, further comprising a light box 300, wherein the light box 300 encloses the light source 50 (or at least the light emitting part). The light box 300 comprises a light transmissive window 330 comprising the collimator 10.

The interior of the light box 300, which is indicated by means of reference 301, can be used to homogenize light of the light source(s) 50.

The lighting unit 5 is configured to provide light 52, which is collimated. The main part of the light 52 may be found within a cone having a cone angle $\gamma$ with the normal to the stack region 2/collimator 10. For instance, the main part of the light 52 may be found within a cone angle $\gamma$ of 65°, thereby substantially reducing glare.

Figure 2C:
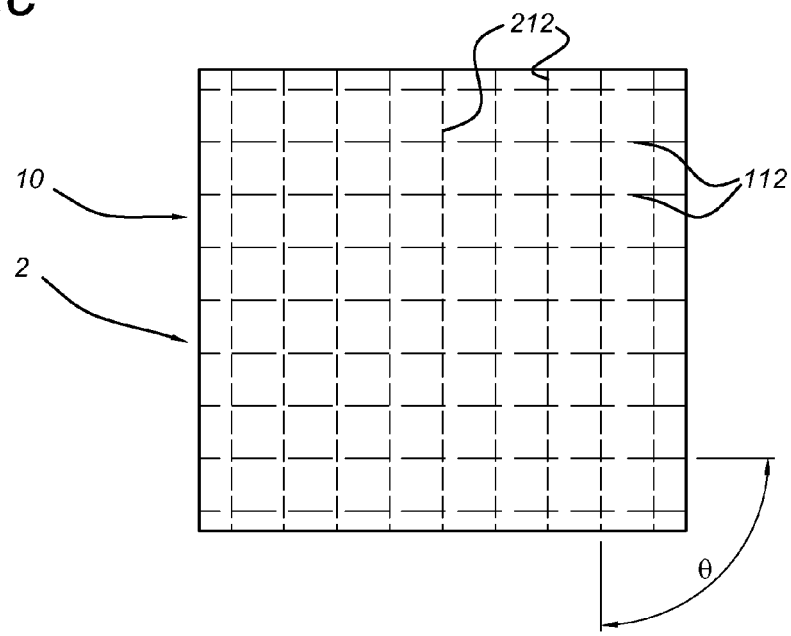

FIG. 2c shows a top view of the collimator 10, similar to the perspective view of FIG. 1f. The collimator 10 here comprises a single stack region 2, or in other words there is only one stack. The stack region 2 comprises at least the first layer and the second layer, in crossed configuration, which is indicated by the crossed first and second prism axes 112,212.

Figure 2D:
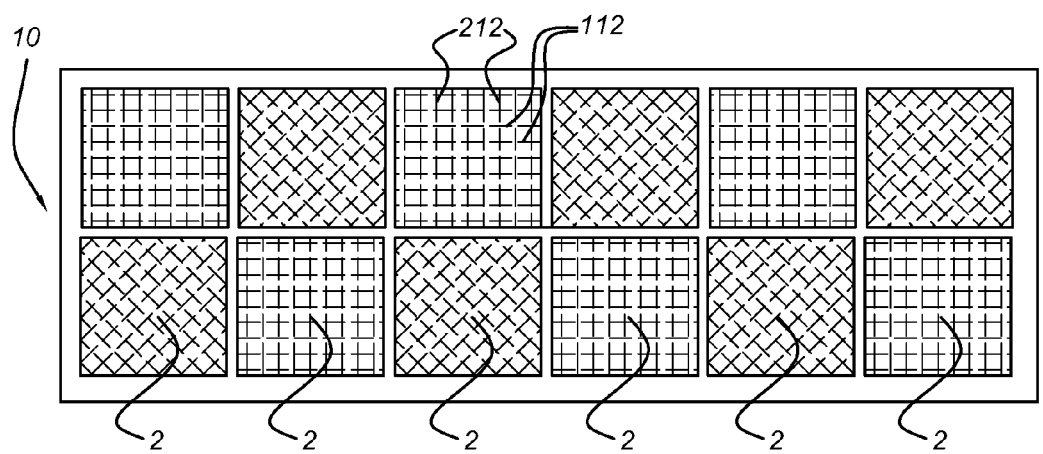

FIG. 2d, however, shows a collimator 10 comprising a plurality of adjacently arranged stacks or stack regions 2. Hence, here the collimator 10 comprises a plurality of stack regions 2. They may all be confined by the first collimator face and the second collimator face ( not indicated in this top view). For instance, by adjacently arranging a plurality of stack regions 2 as schematically depicted in FIGS. 1a-1d, a (similar) embodiment to that schematically depicted in FIG. 2d may be obtained.

Hence, here, the orientation of the prismatic structure is rotated over the layer. By considering different orientations, light incident at a diagonal angle upon the foil will locally align sometimes along a prism direction and sometimes make an angle (for example of 45°, like in this case). A better light distribution may be obtained, with less intensity in the wings of the beam. The period of the repetition may range from 1 mm to several centimeters.

Figure 2E:
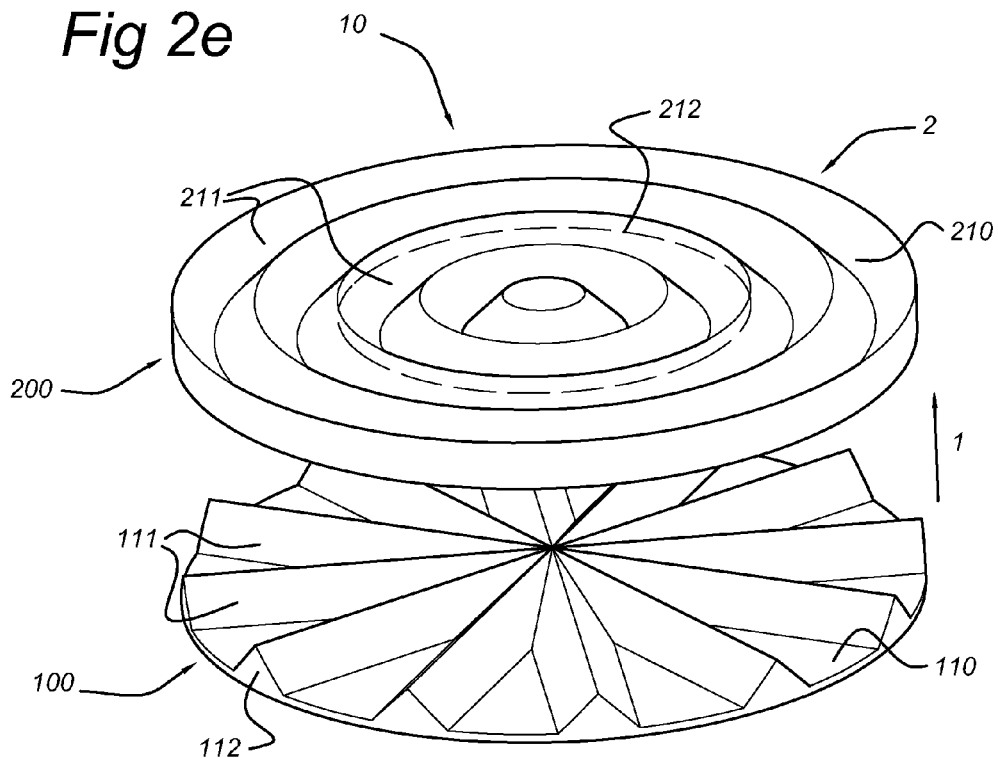

FIG. 2e schematically depicts an embodiment of the collimator 10, wherein the first prism axes 112 and the second prism axes 212 are radially and concentrically arranged, respectively. Here, the first layer 100 comprises radially arranged first prisms 111 and the second layer 200 comprises concentrically arranged second prisms 211. Also in this way, a crossed configuration, with locally orthogonally arranged first prism axes 112 and second prism axes 212, may be obtained. In FIG. 2e, by way of example, the first prisms 111 are radially arranged, and are thus not parallel to one another, whereas the second prisms 211 are concentrically arranged, and are parallel to one another.

Figure 2F:
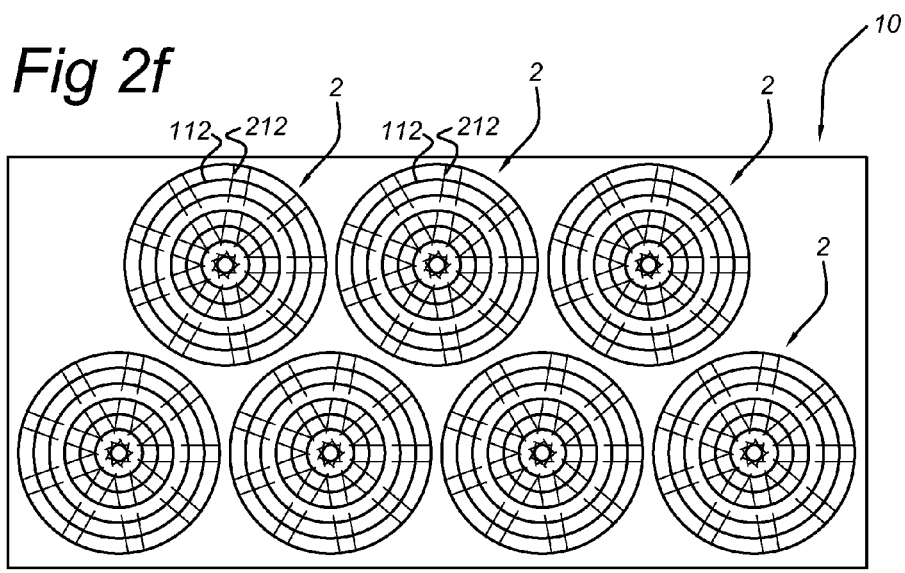

FIG. 2e shows the principle of the embodiment; FIG. 2f schematically depicts a top view of an embodiment with a plurality of stack regions 2 as schematically depicted in FIG. 2e.

Optical simulations show the improvement. Besides a reduction of the cost and improved ease of mechanical handling, the embodiments of the invention may lead to better light conditions than the standard MLO solutions.

The invention claimed is:

1. A collimator comprising:
a first collimator face;
an opposite second collimator face;
a stack region comprising:
a first layer having a first prismatically shaped top face with a plurality of one dimensionally (1D) arranged first prisms having first prism axes;
a second layer having a second prismatically shaped top face with a plurality of 1D arranged second prisms having second prism axes;
an intermediate layer; and
a top layer, wherein the first layer, the intermediate layer, the second layer, and the top layer are adjacently arranged;
wherein the first prism axes and the second prism axes are in a crossed configuration, wherein in a direction from the first collimator face to the second collimator face the index of refraction of material upstream of the first prismatically shaped top face is larger than that of material downstream of the first prismatically shaped top face, and wherein the index of refraction of material upstream of the second prismatically shaped top face is larger than that of material downstream of the second prismatically shaped top face,
wherein the first prismatically shaped top face is the interface between the first layer and the intermediate layer, and wherein the second prismatically shaped top face is the interface between the second layer and the top layer, wherein the index of refraction of the first layer is larger than that of the intermediate layer, and wherein the index of refraction of the second layer is larger than that of the top layer.

2. The collimator according to claim 1, wherein the first prisms and second prisms have prism apex angels ($\alpha$) and groove angles ($\beta$) selected from the range of 70-150°.

3. The collimator according to claim 2, wherein the first prisms and second prisms have prism apex angels ($\alpha$) and groove angles ($\beta$) selected from the range of 80-100°.

4. The collimator according to claim 3, wherein the first prism axes and the second prism axes have mutual angles ($\theta$) in the range of 80-100°.

5. The collimator according to claim 4, wherein the first layer and the second layer have a prismatic layer pitch (p) selected from the range of 5-5000 µm.

6. The collimator according to claim 5, wherein the prismatic layer pitch (p) is selected from the range of 5-200 µm.

7. A collimator comprising:
a first collimator face;
an opposite second collimator face;
a stack region comprising:
a first layer having a first prismatically shaped top face with a plurality of one dimensionally (1D) arranged first prisms having first prism axes; and
a second layer having a second prismatically shaped top face with a plurality of 1D arranged second prisms having second prism axes;
wherein the first prism axes and the second prism axes are in a crossed configuration, wherein in a direction from the first collimator face to the second collimator face the index of refraction of material upstream of the first prismatically shaped top face is larger than that of material downstream of the first prismatically shaped top face, and wherein the index of refraction of material upstream of the second prismatically shaped top face is larger than that of material downstream of the second prismatically shaped top face;

wherein the first prisms and second prisms have prism apex angels (α) and groove angles (β) selected from the range of 80-100°;

wherein the first prism axes and the second prism axes have mutual angles (θ) in the range of 80-100°;

wherein the first layer and the second layer have a prismatic layer pitch (p) selected from the range of 5-200 μm;

wherein the stack region comprises a bottom layer, the first layer, an intermediate layer, the second layer, and a top layer, wherein the bottom layer, the first layer, the intermediate layer, the second layer and the top layer are adjacently arranged, wherein the first prismatically shaped top face is the interface between the first layer and the intermediate layer, and wherein the second prismatically shaped top face is the interface between the second layer and the top layer, wherein the index of refraction of the first layer is larger than that of the intermediate layer, and wherein the index of refraction of the second layer is larger than that of the top layer.

8. The collimator according to claim 7, wherein the first prism axes as well as the second prism axes are parallel arranged axes.

9. The collimator according to claim 7, wherein the first prism axes and the second prism axes are radially and concentrically-arranged, respectively.

10. The collimator according to claim 9, comprising a plurality of adjacently arranged prismatic layer stack regions.

11. A lighting unit comprising a light source, configured to provide light source light, and the collimator according to claim 10, configured to collimate the light source light.

12. The lighting unit according to claim 11, further comprising a light box, wherein the light box encloses the light source and wherein the light box comprises a light transmissive window, wherein the light transmissive window comprises the collimator.

13. A collimator comprising:
a first collimator face;
an opposite second collimator face;
a stack region comprising:
a first layer having a first prismatically shaped top face with a plurality of one dimensionally arranged first prisms having first prism axes;
a second layer having a second prismatically shaped top face with a plurality of arranged second prisms having second prism axes; and
an intermediate layer, wherein the first layer, the intermediate layer, and the second layer are adjacently arranged;
wherein the first prism axes and the second prism axes are in a crossed configuration, wherein in a direction from the first collimator face to the second collimator face the index of refraction of material upstream of the first prismatically shaped top face is larger than that of material downstream of the first prismatically shaped top face, and wherein the index of refraction of material upstream of the second prismatically shaped top face is larger than that of material downstream of the second prismatically shaped top face;
wherein the first prisms and second prisms have prism apex angels (α) and groove angles (β) selected from the range of 80-100°;
wherein the first prism axes and the second prism axes have mutual angles (θ) in the range of 80-100°;
wherein the first layer and the second layer have a prismatic layer pitch (p) selected from the range of 5-200 μm; and
wherein the first prismatically shaped top face is the interface between the first layer and the intermediate layer, and wherein the second prismatically shaped top face is the interface between the intermediate layer and the second layer, wherein the index of refraction of the first is larger than that of the intermediate layer, and wherein the index of refraction of the intermediate layer is larger than that of the second layer.

* * * * *